Aug. 24, 1943.  T. B. ALLARDICE  2,327,691
DUST COLLECTOR
Filed Dec. 17, 1940
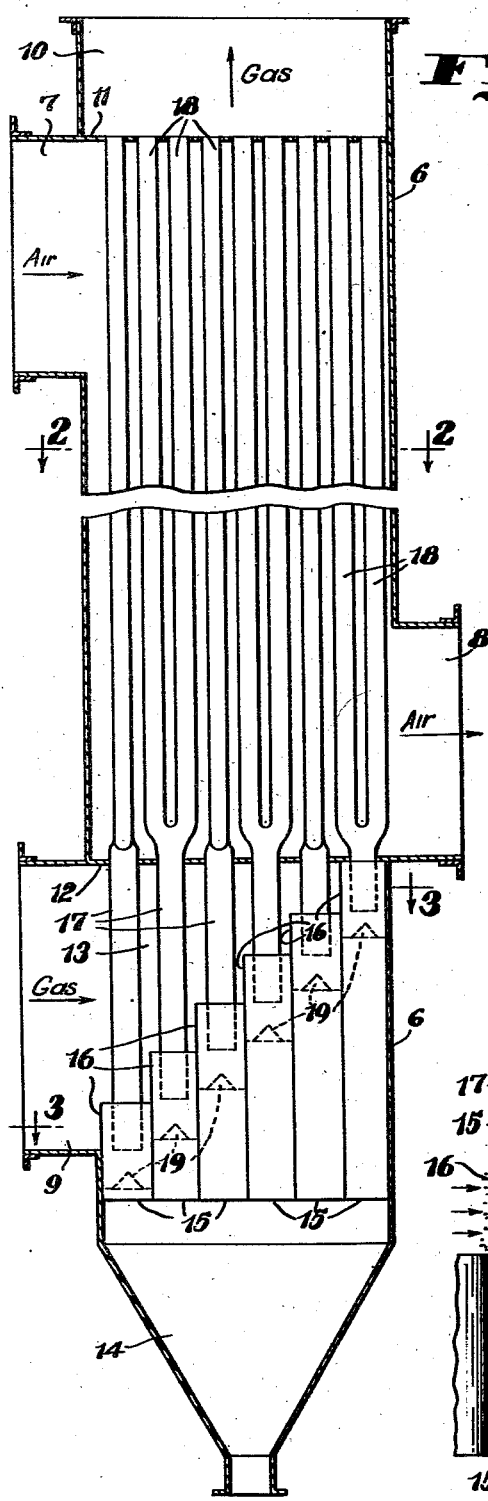
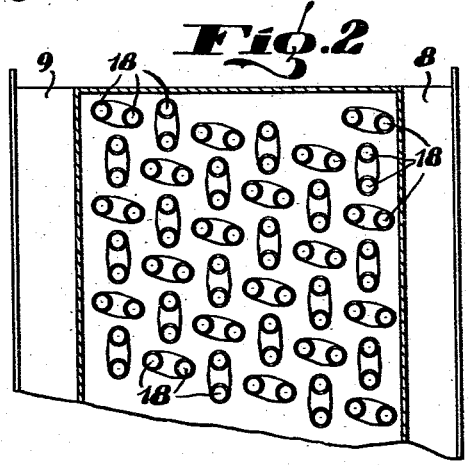
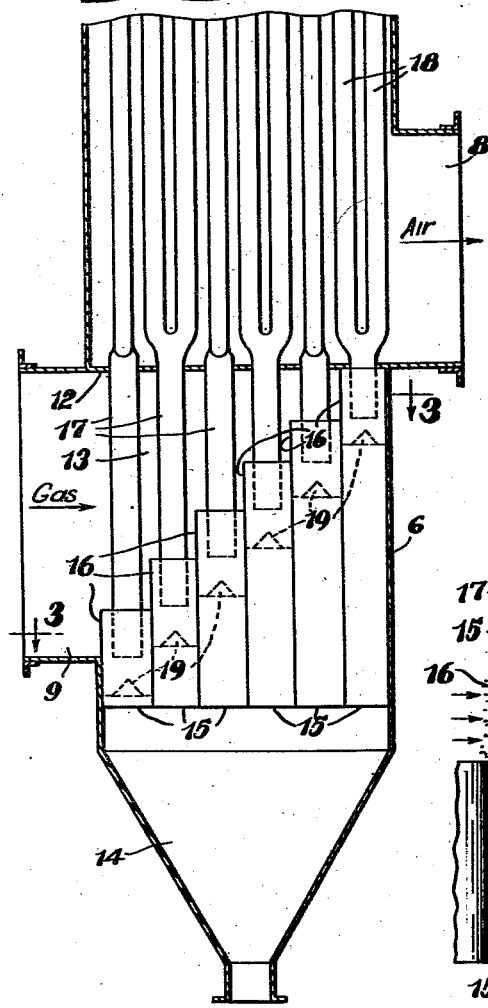
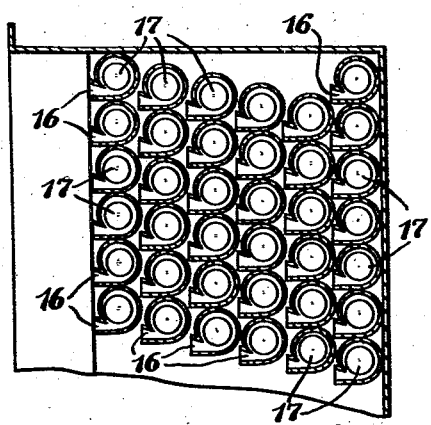
Inventor
Thomas B. Allardice
By Robert J. Palmer
Attorney Patented Aug. 24, 1943

2,327,691

UNITED STATES PATENT OFFICE 2,327,691

DUST COLLECTOR

Thomas B. Allardice, Mountain Lakes, N. J.

Application December 17, 1940, Serial No. 370,444

2 Claims. (Cl. 183—34)

This invention relates to apparatus for separating and collecting solid particles from heated gases and for recovering heat from the gases.

In an embodiment of this invention designed for use with steam power plants, the heated flue gases flow tangentially into involute tubes, in the upper portions of which are inserted the lower ends of round tubes. The solid particles are thrown out by the centrifugal forces developed by the curved gas flow and drop out to a lower collector. The clean gases flow upwardly through the round tubes which above the cinder separating area, are given extended surface in a fluid heating area. The air or other fluid to be heated is passed in contact with the extended surface.

An object of the invention is to provide a dust collector particularly suitable for use with a fluid heater.

The invention will now be described with reference to the drawing, of which:

Fig. 1 is a side elevation, in cross-section, of a combined dust collector and fluid heater embodying this invention;

Fig. 2 is a partial sectional view along the lines 2—2 of Fig. 1;

Fig. 3 is a partial sectional view along the lines 3—3 of Fig. 1, and

Fig. 4 is an enlarged view with a portion in section, of one of the involute dust separating tube assemblies.

The casing 6 which houses the assembly has the air inlet 7, the air outlet 8, the gas inlet 9 and the gas outlet 10. The upper wall 11 and the lower wall 12 separate the gas handling and the air handling areas.

The separating chamber indicated generally by 13 extends in alignment with the gas inlet 9 and between the lower wall 12 and the hopper 14. The separating chamber contains the six rows of involute tubes 15 having the tangential inlets 16 at the gas entering face of the chamber 13 as illustrated by Fig. 3. The tubes of each succeeding row with respect to gas flow are stepped up in height so that the inlets 16 of each succeeding row extend above the upper ends of the preceding tubes. The tubes of the succeeding rows are preferably staggered as illustrated by Fig. 3.

The parallel, round tubes 17 extend vertically in the chamber 13 and their lower ends extend through the upper ends of the involute tubes 15 and serve as will be explained later for conveying the clean gas to the fluid heating chamber.

Just above the floor 12, the tubes 17, each branch into two tubes 18 for providing extended heat exchange surface. The upper ends of the tubes 18 terminate in the upper wall 11, the tubes discharging into the outlet 10 above the wall.

The cones 19 are held in the involute tubes 15 below the lower ends of the tubes 17, by the friction of their supporting arms 20 against the inner surfaces of the tubes 15. The arms 20 may be two or more in number and are sufficiently spaced to permit the free passage of cinders and dust between them as illustrated by Fig. 4. The cones 19 serve to deflect the gases entering at 16 upwardly so as to pass out the tubes 17 and 18 instead of into the hopper 14. The distances of the cones 19 from the lower ends of the tubes 17 may be adjusted by moving the cones within the tubes 15.

In operation, air or other fluid to be heated is drawn in the inlet 7, passes in contact with the outer surfaces of the tubes 18 and then passes out the outlet 8. A suitable conventional blower or other pump (not shown) may be used for moving the air or other fluid through the inlet 7 and the outlet 8.

The flue gases through the action of the fan system of the plant associated with the apparatus, or through the action of an auxiliary fan, are forced at relatively high velocity through the gas inlet 9 and thence into the inlets 16 of the involute tubes 15. The gas travels spirally around the lower ends of the tubes 17, within the involute tubes 15; the solid matter carried by the gas is thrown out by centrifugal force against the inner surfaces of the tubes 15 and falls by gravity into the hopper 14. The clean gas is deflected by the cones 19 into the lower ends of the tubes 17 and then passes through the tubes 18 to heat the air or other fluid in contact with their outer surfaces.

While one embodiment of the invention has been described for the purpose of illustration, it should be understood that the invention is not limited to the exact apparatus and arrangement of apparatus illustrated as modifications thereof may be suggested by those skilled in the art without departure from the essence of the invention.

What is claimed is:

1. A dust collector having a casing with a gas inlet and a gas outlet, comprising a plurality of rows of parallel, substantially vertically extending, involute tubes having tangential inlets in their upper ends extending into said inlet, the tubes of succeeding rows with respect to gas flow extending sufficiently above the upper ends of the tubes of preceding rows that the inlets of the tubes of the succeeding rows are completely above the upper ends of the tubes of the preceding rows, a plurality of rows of gas outlet tubes having their lower ends extending into the upper ends of said involute tubes and having their upper ends connecting with said gas outlet, and dust collecting means below and connecting with the lower ends of said involute tubes.

2. A dust collector having a casing with a gas inlet and a gas outlet, comprising a plurality of rows of parallel, substantially vertically extending, involute tubes having tangential inlets in their upper ends, extending into said inlet, the tubes of succeeding rows with respect to gas flow extending sufficiently above the upper ends of the tubes of preceding rows that the inlets of the tubes of the succeeding rows are completely above the upper ends of the tubes of the preceding rows, a plurality of rows of gas outlet tubes having their lower ends extending into the upper ends of said involute tubes and having their upper ends connecting with said gas outlet, and dust collecting means below and connecting with the lower ends of said involute tubes, the involute tubes of succeeding rows with respect to gas flow being staggered with respect to the involute tubes of preceding rows whereby the tangential inlets of the involute tubes of the succeeding rows are not obstructed by the preceding outlet tubes.

THOMAS B. ALLARDICE.